United States Patent [19]

Connell et al.

[11] Patent Number: 4,501,672

[45] Date of Patent: Feb. 26, 1985

[54] ORGANIC COMPOUNDS

[75] Inventors: David L. Connell; Jacqueline A. Coates, both of Leeds, England

[73] Assignee: Sandoz Ltd., Basel, Switzerland

[21] Appl. No.: 478,679

[22] Filed: Mar. 25, 1983

[30] Foreign Application Priority Data

Mar. 30, 1982 [GB] United Kingdom ................ 8209275
Mar. 30, 1982 [GB] United Kingdom ................ 8209276

[51] Int. Cl.³ .............................................. C09K 7/06
[52] U.S. Cl. .............................. 252/8.5 M; 252/8.5 P; 252/8.55 R
[58] Field of Search ............ 252/8.5 M, 8.5 P, 8.55 R

[56] References Cited

U.S. PATENT DOCUMENTS

| 3,168,475 | 2/1965 | Jordan et al. | 252/8.5 |
|---|---|---|---|
| 3,281,458 | 10/1966 | Jordan et al. | 562/473 X |
| 3,594,447 | 7/1971 | Wincklhofer et al. | 260/857 |
| 3,671,427 | 6/1972 | Andrews et al. | 252/8.5 |
| 4,374,737 | 2/1983 | Larson et al. | 252/8.5 P |
| 4,421,655 | 12/1983 | Cowan | 252/8.5 |

OTHER PUBLICATIONS

Abstract of Russian Patent 870,427.

Primary Examiner—Herbert B. Guynn
Attorney, Agent, or Firm—Gerald D. Sharkin; Richard E. Vila; Thomas C. Doyle

[57] ABSTRACT

A fluid loss reducing additive for an oil-based well working fluid is the product of mixing together, in an oil or oil-based fluid, lignite or humic acid with an aliphatic amide or hydroxyamide, or a cyclic derivative thereof, containing no primary or secondary amine or amine salt groups.

17 Claims, No Drawings

ORGANIC COMPOUNDS

The invention relates to the preparation of improved fluid loss reducing additives for use in oil based drilling, completion and packer fluids and to the products so obtained.

In the drilling of wells by the rotary drilling technique drilling fluid is circulated from tanks at the wellhead down the inside of the drill-pipe, through the bit and back up the annulus. On reaching the wellhead the fluids are subjected to a number of treatments designed to remove gases or solid materials such as drilled cuttings, sand, colloidal material, etc. from the fluid before being returned to the well via the mud tanks. During the course of this circulation the properties of the drilling fluid change due to a number of factors such as ingress of water or fine solids or temperature degradation of the components of the fluid. As a result the fluid is treated to regenerate the required properties and this treatment generally involves the addition of chemicals.

As the total reserves of oil diminish it has become necessary to drill in areas which were previously inaccessible due to technological or economic difficulties. This has led to the development of increasingly sophisticated drilling fluids and in particular to the widespread use of oil-based fluids.

These have a number of advantages over conventional water-based drilling fluids.

Oil-based fluids are less prone to thermal degradation than water-based fluids and as a result are used to drill deep hot holes.

In order to drill effectively from offshore platforms economics dictate that as much of the field as possible should be exploited from each platform. This has led to an increase in the number of deviated wells and also to an increase in the maximum angle of deviation. The latter causes a marked increase in the torque required to maintain rotation of te drill-string. Oil-based drilling fluids exhibit extremely good lubricity compared with water based fluids and have proved particularly effective in the drilling of deviated wells.

Drilling through hydratable shales has proved troublesome due to the swelling and sloughing of these formations on contact with aqueous drilling fluids. The problem is common throughout the world and not only leads to wellbores which are out of gauge but also to torque and stuck-pipe problems. Oil-based drilling fluids do not affect most shales and are ideally suited to drilling through these formations.

In order to achieve maximum production rate from a well it is important that the fluid used to penetrate the production zone and the subsequent completion fluid do not damage the formation. Oil-based drilling fluids are designed to give a filtrate consisting only of oil and since this is essentially native to the production formation it does not lead to a reduction in permeability. Aqueous fluids can cause loss of productivity due to pore contraction and blocking as a result of the hydration of clays.

Other types of fluid which are used in well-working operations include completion fluids and packer fluids. Completion fluids are used to flush out the well before it is cemented and the metal casing is inserted. Packer fluids are then used to fill the annular space between the casing and the tubing in the hole. Because these fluids remain in contact with metal surfaces over prolonged periods, corrosion is a serious problem; here oil-based packer fluids have the advantage of being essentially non-corrosive.

Drilling fluids, completion fluids and packer fluids are referred to generally in this specification as "well-working fluids", or "muds".

Oil-based well-working fluids can be classified as true oil muds and invert emulsion muds. The former contain only a small amount of water whilst the latter may contain up to 40% water as the dispersed phase of an invert (water-in-oil) emulsion. Each of these fluids may contain a number of additives such as emulsifiers, viscosifiers, fluid loss reducing additives and various inorganic salts.

Fluid loss reducing additives are added to minimise loss of the well-working fluid by filtration of the fluid through porous strata. Such products are generally asphaltic or lignitic.

Known lignitic fluid loss reducing additives for oil-based well working fluids are prepared by reacting humic acid (the alkali-soluble fraction of lignite) in free acid or sodium salt form with a long-chain alkyl substituted amine or ammonium salt in an aqueous medium. The products are dried and then dispersed in an oil-based well-working fluid, generally with the aid of various organic compounds as dispersing agents.

Other lignitic fluid loss reducing additives may be prepared by reacting humic acid with the partial fatty acid amide of a polyalkylene polyamine, either in an aqueous medium or by heating in an oil.

It has also been found that lignite may be treated in an oil medium with an amine salt, an amide-amine, or a salt thereof, containing at least one long chain alkyl or alkenyl group, without application of heat, to give a product having superior fluid loss reducing activity.

The product is obtained by a simple mixing process and it is unnecessary to isolate the humic acid in its sodium salt form or to isolate the substituted ammonium humate and subsequently disperse it in the oil-based fluid.

It has now been found that good results may be obtained if the lignite is reacted in an oil medium with certain amides or amide derivatives having no free primary or secondary amino groups.

The present invention provides a fluid loss reducing additive for an oil-based well working fluid which is the product of mixing together, in an oil or oil-based fluid, lignite or humic acid with an aliphatic amide or hydroxyamide, or a cyclic derivative thereof, containing no primary or secondary amine or amine salt groups, and of formula I, II or III below or mixtures thereof:

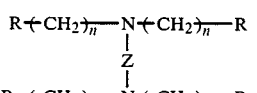   I

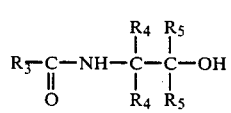   II

-continued

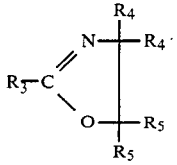   III in which each R, independently, and each $R_1$, independently, is —OH— or —NHCOR', where R' is $C_{1-22}$alkyl, $C_{2-22}$alkenyl or $C_{2-6}$hydroxyalkyl, provided that not more than one group R, and not more than one group $R_1$, is —OH, each n independently, is an integer from 2 to 6 and Z is a difunctional bridging group, $R_3$ is $C_{8-20}$alkyl or $C_{8-20}$alkenyl, each $R_4$ independently is hydrogen, $C_{1-4}$alkyl or $C_{1-4}$hydroxyalkyl, provided that both $R_4$'s are not hydrogen and each $R_5$ independently has one of the significances of $R_4$, except that both $R_5$'s may be hydrogen.

The oxazoline of formula III may be regarded as a cyclic derivative of the hydroxyamide II, since it is capable of being formed by the elimination of water between the hydroxyl group and the amide —NH— group of II.

The term 'primary or secondary amine groups' does not include the groups —$NH_2$ or —NH— when attached to a carboxyl group as part of an amide group.

In the compounds of formula I, preferably at least one group R or $R_1$ is —NHCOR' where R' is a $C_{12-22}$alkyl or alkenyl group, more preferably a $C_{14-18}$alkyl or alkenyl group. Such groups are preferably predominantly straight chain. More preferably all groups R and $R_1$ are the same. Each n independently is preferably 2 or 3.

The bridging group Z is preferably of formula (a)–(f) below:

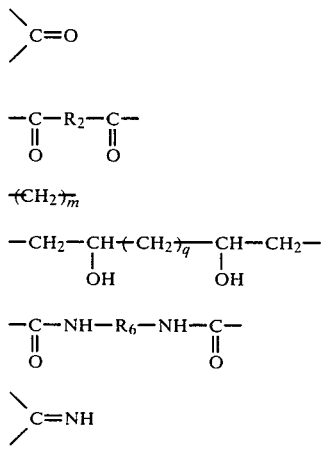

in which
   $R_2$ is a direct bond, $C_{1-12}$alkylene, $C_{2-12}$alkenylene, $C_{36}$ alkenylene (preferably that derived from oleic dimer acid) or phenylene, preferably o-phenylene, which may be unsubstituted or substituted by up to 2 groups selected from hydroxy, $C_{1-18}$alkyl and $C_{1-6}$hydroxyalkyl, provided that not more than one substituent is hydroxy;

m is an integer from 1–12, preferably 1–4;
q is an integer from 2–8
and $R_6$ has any of the significances of $R_2$ except a direct bond.

Preferably the bridging group Z is polar in nature, and is a group (a) or a group (b). More preferably it is a group (a) or a group (b) in which $R_2$ is —CH=CH— (cis or trans).

The compounds of formula I may be prepared by reaction of 1 mole of a compound of formula IV

   IV and 1 mole of a compound of formula V

   V with 1 mole of a crosslinking reagent capable of reacting with the secondary amino groups of compounds IV and V. When Z is a group (a)–(c), the crosslinking reagent is a group Y—Z—Y, such that when Z is a group (a), Y—Z—Y may for example be phosgene or, preferably, urea. When Z is a group (b) Y—Z—Y may be a dicarboxylic acid or a functional derivative thereof such as an anhydride, ester or acid halide. For example when $R_2$ is —CH=CH—, Y—Z—Y may be maleic or fumaric acid, or maleic anhydride. When Z is a group (c), Y—Z—Y may be an alkylene dihalide for example 1,2-dichloroethane. When Z is a group (d), the crosslinking agent is a diepoxide of formula

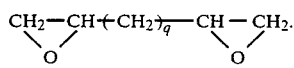

When Z is a group (e), the crosslinking reagent is a diisocyanate of formula OCN—$R_6$NCO and when Z is a group (f), the crosslinking reagent is guanidine or a guanidine salt. Compounds IV and V are preferably identical; when they are not identical, mixtures of products of formula I will be obtained.

Compounds of formula IV are known or may be prepared in known manner for example by the reaction of 1 mole of a dialkylene triamine with 2 moles of a fatty acid or fatty acid derivative. Preferably the acid itself is used, and may be in the form of a commercial mixture such as crude tall oil fatty acid, containing predominantly oleic acid. Where one group R is OH, the compound IV is similarly obtained by reaction of 1 mole of a hydroxyalkyl alkylene diamine with 1 mole of a fatty acid or fatty acid derivative.

It will generally not be possible, in reacting a 1 mole of a dialkylene triamine with 2 moles of a fatty acid or derivatives, to obtain a perfect 1:2 reaction in which the sole product is of the formula VI

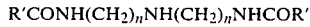   VI

Normally a mixture will be obtained which will contain some monoamidated product VII

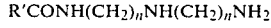   VII as well as some triamidated product VIII

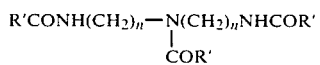   VIII

Compound VIII will of course be inert to the subsequent crosslinking reaction, whereas compound VII, having two reactive sites, will on crosslinking with VI be capable of giving rise to trimers such as IX

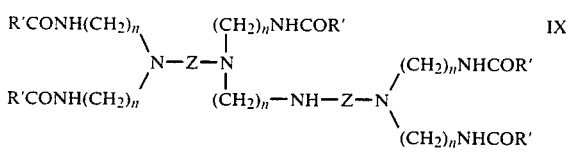

or higher oligomers. Small quantities of such oligomers will normally be present in compounds of formula I prepared by this method. It may also be desired deliberately to increase the proportion of such oligomers by reacting 1 mole of the compound of formula IV with less than two moles of fatty acid or derivative. Products of this type when reacted with lignite are also considered within the scope of the present invention.

Alternatively certain compounds of formula I in which one group R and/or one group $R_1$ is —OH may be prepared by reacting a compound of formula

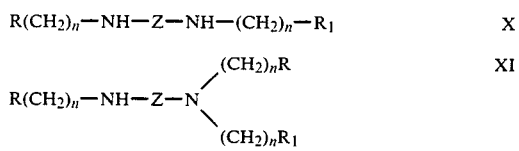

with ethylene oxide or with an α-halo-ω-hydroxyalkane.

In the compounds of formula II and III, $R_3$ is preferably $R_3'$ where $R_3'$ is $C_{14-18}$alkenyl, preferably predominantly straight chain; each $R_4$ is preferably $R_4'$ where $R_4'$ is hydrogen, methyl, ethyl, hydroxymethyl or β-hydroxyethyl, provided that both groups $R_4'$ are not hydrogen. Preferably both groups $R_5$ are hydrogen.

Preferred compounds of formula II and III are those of formulae XII and XIII

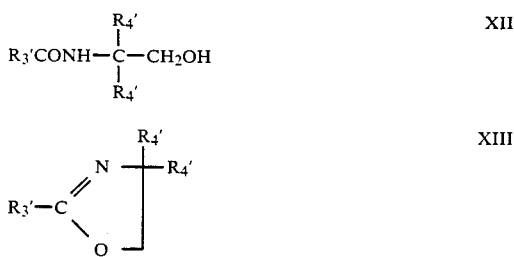

The compounds of formula III may be prepared by cyclisation of compounds of formula II with loss of water. This reaction may be carried out by heating the compound of formula II under vacuum at temperatures of 120° to 200°. The reaction often does not go to completion, and gives rise to mixtures of compounds II and III. Compounds of formula II are known or may be prepared in known manner by analogy with known compounds.

The additives according to the invention may be prepared by mixing the amide, hydroxyamide or cyclic derivative thereof with lignite or humic acid in an oil or an oil-based medium. By "oil-based medium" is meant a two-phase system in which the oil is a continuous phase, and which contains not more than 15% by weight based on the total weight of the mixture, of an aqueous disperse phase. The mixing may take place at temperatures up to the boiling point of the medium, but preferably is at a temperature not greater than 70° C., more preferably not greater than 50° C.

Where compounds of formulae II and/or III are used, the lignite or humic acid may be mixed with the oxazoline III, its open-chain hydroxyamide precursor II or with a mixture obtained by incomplete cyclisation of the precursor II.

The particle size of the lignite is not critical but is preferably less than 500 microns. The presence of a few larger particles does not necessarily detract from the performance of the product, but may lead to settlement during prolonged storage. In a preferred embodiment of the present invention the mixing conditions are such that larger particles are broken down during the course of the preparation of the products.

In the following process description, the amide, hydroxyamide or cyclic derivative thereof will be generally referred to by the term "amide", and lignite or humic acid by the term "lignite".

The proportion of amide to lignite in the products of the invention may vary between wide limits. If too little amide is used, the lignite tends to separate out; excess of amide is generally not harmful, but may be uneconomic. Typical proportions are in the range of 1:2 to 2:1 lignite:amide by weight, preferably approximately 1:1.

The oil used for the purposes of the present invention is most often diesel oil but may also be one of a number of crude fractions, kerosine etc. The oil chosen should be compatible with the oil-based well-working fluid to which the product will be added.

The product of the present invention is preferably a pourable liquid concentrate which may be added to a well-working fluid as required, for example to make up a new mud or to recondition a used mud. In the concentrate, the ratio of lignite+amide to oil or oil-based fluid is normally from 1:4 to 4:1, preferably 1:2 to 2:1, more preferably 1:1 by weight.

The concentrate is added to the well-working fluid so as to give a concentration of lignite+amide in the fluid of preferably from 1 to 10 pounds per barrel (approx. 0.28 to 2.8% wt/vol), more preferably 2-5 pounds per barrel.

Since it is normally intended that the products of this invention be used without further processing it is advantageous to ensure that settlement of lignite materials does not occur under normal storage conditions. This can be achieved by adding an oleophilic bentonite or an oleophilic attapulgite. Many products of this type are available and their use will be familiar to those skilled in the art.

In most cases only a few percent by weight of these viscosifiers will be required to stabilise the product. It may be advantageous to add a small volume of water to enhance the viscosifying properties of these oleophilic bentonites and attapulgites.

The process of the present invention is carried out by simply mixing the various components. The period and conditions of mixing are not critical but the storage stability of the product is enhanced by applying vigorous shear in order to reduce the particle size. The use of a high speed mixer of the Silverson type, or a bead mill or trigonal type pin mill is preferred in producing products having good fluid loss reducing properties and storage stability.

Mixing is preferably carried out at normal ambient temperature plus whatever temperature rise occurs as a consequence of the mixing process. It is an advantage of the preferred process according to the invention that it is carried out at a temperature below the flash point of diesel oil (70° C.).

It is also found that the addition of small quantities of water to the composition gives a more rapid interaction between the amide and the lignite and gives rise to superior fluid loss reducing properties. The water may be added before or during the mixing operation, but it is essential that the lignite be oil-wetted before any water is added; that is, the reaction of the lignite with the amide takes place in an oil medium and not in an aqueous medium. Typically the quantity of water used may be from 1% to 15% by weight of the total quantity of lignite plus amide present, preferably 5% to 10% by weight.

The amides used in the present invention have the advantage that they show little or no tendency to excessive thickening even on prolonged processing with lignite.

The following Examples illustrate the invention.

EXAMPLE 1

(a) preparation of 2:1 amide of crude oleic acid and diethylene triamine

Under an atmosphere of nitrogen, 606 g (2 moles) of tall oil fatty acid (Vantal A. 5-55) is added to 103 g (1 mole) of diethylene triamine over about 1 hour. At the start, the temperature is about 50° C. and is allowed to rise to about 110° C. by the end of addition to prevent gelation of the amide salt. The mixture is heated to 140° C. over about 1 hour and held at 140° C. for about 1.5 hours. The reaction vessel is converted to distillation and the temperature is held at 140° C. whilst the pressure is reduced to 400 mm Hg over 1 hour. Distillation is continued for about 3 hours or until analysis indicates the reaction is complete.

(b) bridging with maleic anhydride

129 Parts (2 moles) of the diethylenetriamine di-oleylamide of 1 (a) are heated to 130° C., under a nitrogen atmosphere, with stirring, under reflux conditions. 9.8 Parts (1 mole) of maleic anhydride are added over 30 minutes. The reaction is continued for 3 hours at 130° C. after which the vessel is converted to distillation. When distillation ceases the dark brown product is cooled and discharged.

(c) fluid loss control additive

Using a Silverson mixer at 6000 rpm with high shear screen fitted, 49.6 parts of a bridged oleylamide (prepared as in Example 1 (b) above) are dissolved in 135 parts diesel oil. 44.6 Parts of North Dakota lignite are added followed by 9.4 parts of water. The process is continued for one hour with slight water cooling of the vessel so that the process temperature is about 30° C. 48.25 Parts of this mixture is stirred with 1.75 parts of a bentonite clay-based viscosifying agent to yield the finished product.

EXAMPLE 2 BRIDGING WITH UREA

129 Parts (2 moles) of the diethylenetriamine di-oleylamide of Example 1 (a) are heated to 160° C. under a nitrogen atmosphere, with stirring, under reflux conditions. 6 Parts (1 mole) of urea are added over 1 hour. The reaction is continued at 160° C. for 3 hours until ammonia is no longer evolved from the reaction. The dark brown product is cooled and discharged, and used according to the procedure of Example 1 (c) to give a fluid loss control additive.

EXAMPLE 3 BRIDGING WITH PHTHALIC ANHYDRIDE

129 Parts (2 moles) of the diethylenetriamine di-oleylamide of Example 1 (a) are heated to 130° C., under a nitrogen atmosphere, with stirring, under reflux conditions. 14.8 Parts (1 mole) of phthalic anhydride are added over 30 minutes. The reaction is continued for 3 hours at 130° C., after which the vessel is converted to distillation. When distillation ceases, the pale brown product is cooled and discharged, and used according to the procedure of Example 1 (c) to give a fluid loss control additive.

EXAMPLE 4

(a) Preparation of hydroxyamide 137.1 Parts (1.5 moles) of 2-amino-2-methylpropan-1-ol are added slowly to 421.5 parts (1.5 moles) of commercial oleic acid, with stirring, at 30° C. The temperature is then raised to 140° C. over 2 hours; and the mix refluxed at this temperature for a further hour. Water is then allowed to distil over with a slow flow of nitrogen, until the amount of distillate and IR analysis indicates satisfactory formation of the amide of formula

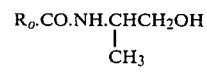

($R_o$ = alkenyl group from crude oleic acid)

(b) Preparation of fluid loss control additive 49.5 g of the amide prepared as in (a) is dissolved in 135 g diesel oil and mixed at 6,000 rpm using a laboratory Silverson mixer. 46.8 g of ground North Dakota lignite is added and stirring continued for 3 minutes, after which 9.4 g of water is added and stirring continued for 2 hours.

48.25 g of this mixture is stirred with 1.75 g of a bentonite clay based viscosifying agent to yield the finished product.

EXAMPLE 5

(a) Preparation of oxazoline 95.2 Parts (0.8 mole) of 2-amino-2-ethyl-1,3-propanediol are added to 231.4 parts (0.8 mole) of commercial tall oil. The mixture is then heated to 115° C. under nitrogen reflux, at which temperature water begins to form. The temperature is then raised to 125° C. and maintained for one hour.

The condenser is then adjusted for distillation, and the temperature raised over 2 hours to 175° C., whilst a vacuum of 150 mm Hg is applied.

Maintaining the temperature at 175° C., the vacuum is then increased over the next 2 hours until the theoretical amount of water has been removed.

The product is a yellow-brown liquid, whose IR spectrum confirms the presence of an oxazoline ring.

(b) Example 4(b) is repeated, using the product of Example 5(a) in place of that of Example 4(a).

EXAMPLE 6

Example 4(b) is repeated using a commercial oxazoline sold under the trademark Alkalterge T and believed to have the structure

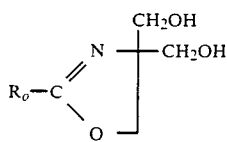

where $R_o$ is as defined above.

EXAMPLES 7-9

Examples 1(b), 2 and 3 are repeated using in place of the product of Example 1(a) the product obtained by reacting under the conditions of Example 1(a) 303 g (1 mole) of tall oil fatty acid with 104 g (1 mole) of hydroxyethyl ethylene diamine.

The products may be used to prepare fluid loss reducing additives as described in Example 1(c).

APPLICATION EXAMPLE

As a laboratory screening test, 10 g of the finished product of Example 1(c) is mixed with 350 ml diesel oil at 12000 rpm for 30 minutes. The product shows excellent fluid loss reduction measured by the API test at 100 psi for 30 minutes. The products of Examples 2, 3, 4(b) 5(b) and 6 give similar results.

We claim:

1. A fluid loss reducing additive for an oil-based well-working fluid which is the product of mixing together, in an oil or in a two-phase system comprising oil as a continuous phase and up to 15% by weight, based on the total weight of the mixture, of an aqueous disperse phase, lignite or humic acid with a compound containing no primary or secondary amine or amine salt groups and being of formula I, II or III below, or a mixture thereof

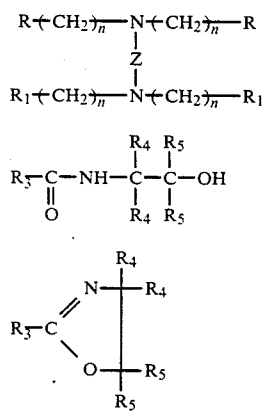

in which
each R, independently, and each $R_1$, independently, is —OH— or —NHCOR′, where R′ is $C_{1-22}$alkyl, $C_{2-22}$alkenyl or $C_{2-6}$hydroxyalkyl, provided that not more than one group R, and not more than one group $R_1$, is —OH,
each n, independently, is an integer from 2 to 6, Z is a difunctional bridging group, $R_3$ is $C_{8-20}$alkyl or $C_{8-20}$alkenyl,
each $R_4$, independently, is hydrogen, $C_{1-4}$alkyl or $C_{1-4}$-hydroxyalkyl, provided that both $R_4$'s are not hydrogen,
and each $R_5$, independently, has one of the significances of $R_4$, except that both $R_5$'s may be hydrogen, wherein the proportion by weight of lignite or humic acid to total compound of formula I, II, or III is between 1:2 and 2:1.

2. A fluid loss-reducing additive according to claim 1 wherein, in formula I, Z is the divalent residue of a crosslinking agent resulting from the reaction of said crosslinking agent with the secondary amino groups of a compound of formula IV and a compound of formula V $$R-CH_2)_nNH-CH_2)_nR \qquad IV$$

$$R_1-CH_2)_nNH-CH_2)R_1 \qquad V$$

in which R, $R_1$ and n are as defined in claim 1.

3. A fluid loss reducing additive according to claim 1 which is the product of mixing together the lignite or humic acid with a compound of formula I in which at least one group R or $R_1$ is —NHCOR′ where R′ is a $C_{12-22}$alkyl or $C_{12-22}$alkenyl group.

4. A fluid loss reducing additive according to claim 3 in which, in the compound of formula I, all groups R and $R_1$ are identical.

5. A fluid loss reducing additive according to claim 3 in which, in the compound of formula I, the bridging group Z is of formula (a)-(f)

(a)

(b)

(c)

(d)

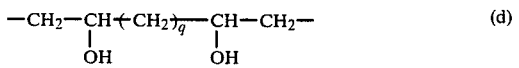

(e)

(f)

in which
$R_2$ is a direct bond, $C_{1-12}$alkylene, $C_{2-12}$alkenylene, $C_{36}$alkenylene, or phenylene which may be unsubstituted or substituted by up to 2 groups selected from hydroxy, $C_{1-18}$alkyl and $C_{1-6}$hydroxyalkyl, provided that not more than one substituent is hydroxy;
m is an integer from 1-12
q is an integer from 2-8
and
$R_6$ has any of the significances of $R_2$ except a direct bond.

6. A fluid loss reducing additive according to claim 5 in which, in the compound of formula I, the bridging group Z is a group

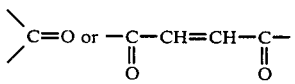

7. A fluid loss reducing additive according to claim 1 which is the product of mixing together the lignite or humic acid with a compound of formula II a compound of formula III, or a mixture thereof.

8. A fluid loss reducing additive according to claim 7 which is the product of mixing together the lignite or humic acid with a compound of formula XII, a compound of formula XIII or a mixture thereof

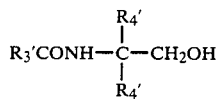   XII

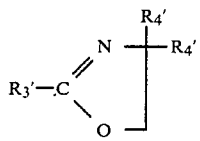   XIII in which
R$_3'$ is C$_{14-18}$alkenyl,
and each
R$_4'$ independently is hydrogen, methyl, ethyl, hydroxymethyl or β-hydroxyethyl, provided that both groups R$_4'$ are not hydrogen.

9. A fluid loss-reducing additive according to claim 2 wherein, in formula I, Z is the divalent residue of a crosslinking agent resulting from the reaction of said crosslinking agent with the secondary amino groups of a compound of formula IV and a compound of formula V R—CH$_2$)$_n$NH—CH$_2$)$_n$R    IV R$_1$—CH$_2$)$_n$NH—CH$_2$)R$_1$    V in which R, R$_1$ and n are as in claim 8.

10. A fluid loss-reducing additive according to claim 1 in which, in the compound of formula I, the bridging group Z is of formula (a)–(f)

   (a)

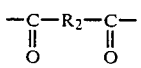   (b)

   (c)

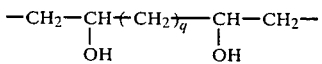   (d)

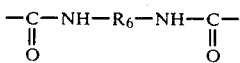   (e)

   (f)

in which
R$_2$ is a direct bond, C$_{1-12}$alkylene, C$_{2-12}$alkenylene, C$_{36}$ alkenylene, or phenylene which may be unsubstituted or substituted by up to 2 groups selected from hydroxy, C$_{1-18}$alkyl and C$_{1-6}$hydroxyalkyl, provided that not more than one substituent is hydroxy;
m is an integer from 1–12
q is an integer from 2–8
and
R$_6$ has any of the significances of R$_2$ except a direct bond.

11. A pourable liquid concentrate containing a fluid loss-reducing additive according to claim 1 in an oil or in a two-phase system comprising oil as a continuous phase and up to 15% by weight, based on the total weight of the mixture, of an aqueous disperse phase, the weight ratio of lignite or humic acid plus compound or mixture of compounds of formulae I, II and III to oil or two-phase system being form 1:4 to 4:1.

12. A pourable liquid concentrate according to claim 11 wherein, in the compound of formula I, the bridging group Z is of formula (a)–(f)

   (a)

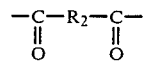   (b)

   (c)

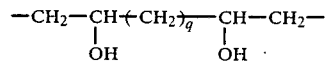   (d)

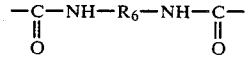   (e)

   (f)

in which
R$_2$ is a direct bond, C$_{1-12}$alkylene, C$_{2-12}$alkenylene, C$_{36}$ alkenylene, or phenylene which may be unsubstituted or substituted by up to 2 groups selected from hydroxy, C$_{1-18}$alkyl and C$_{1-6}$hydroxyalkyl, provided that not more than one substituent is hydroxy;
m is an integer from 1–12
q is an integer from 2–8
and
R$_6$ has any of the significances of R$_2$ except a direct bond.

13. A pourable liquid concentrate according to claim 12 which further comprises an oleophilic bentonite or oleophilic attapulgite in an amount effective to prevent settlement of the lignite or humic acid under normal storage conditions.

14. An oil-based well-working fluid containing a fluid loss reducing additive according to claim 1 in a concentration between 1 and 10 pounds per barrel.

15. An oil-based well-working fluid containing a fluid loss reducing additive according to claim 10 in a concentration between 1 and 10 pounds per barrel.

16. A process for the preparation of a fluid loss reducing additive according to claim 1 comprising mixing together, in an oil or in a two-phase system comprising oil as a continuous phase and up to 15% by weight, based on the total weight of the mixture, of an aqueous disperse phase, a compound of formula I, II or III, or a mixture thereof, with lignite or humic acid, at a temperature not greater than 50° C., under mixing conditions such that lignite or humic acid particles larger than 500 microns are substantially broken down during the process.

17. A process for the preparation of a fluid loss-reducing additive according to claim 10 which comprises mixing together, in an oil or in a two-phase system comprising oil as a continuous phase and up to 15% by weight, based on the total weight of the mixture, of an aqueous disperse phase,
 (a) a compound of formula I, II or III or mixture thereof
with
 (b) lignite or humic acid, in a proportion of (a):(b) between 1:2 and 2:1, at a temperature not greater than 50° C., under mixing conditions such that lignite or humic acid particles larger than 500 microns are substantially broken down during the process.

* * * * *